United States Patent
Ning et al.

(10) Patent No.: US 8,023,250 B2
(45) Date of Patent: *Sep. 20, 2011

(54) SUBSTRATE FOR USE IN WET CAPACITORS

(75) Inventors: Gang Ning, Myrtle Beach, SC (US);
Zebbie Lynn Sebald, Myrtle Beach, SC (US); Bharat Rawal, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/209,588

(22) Filed: Sep. 12, 2008

(65) Prior Publication Data

US 2010/0067174 A1 Mar. 18, 2010

(51) Int. Cl.
*H01G 9/04* (2006.01)
(52) U.S. Cl. ........ 361/516; 361/508; 361/509; 361/517; 361/523; 361/528
(58) Field of Classification Search .......... 361/516, 361/517–519, 502–504, 508–512, 523–529
See application file for complete search history.

(56) References Cited

U.S. PATENT DOCUMENTS

| | | |
|---|---|---|
| 3,345,545 A | 10/1967 | Bourgault et al. |
| 3,663,387 A | 5/1972 | Harrison |
| 3,956,080 A | 5/1976 | Hradcovsky et al. |
| 4,584,067 A | 4/1986 | Hutchins et al. |
| 4,687,551 A | 8/1987 | Furneaux et al. |
| 4,992,910 A | 2/1991 | Evans |
| 5,098,485 A | 3/1992 | Evans |
| 5,369,547 A | 11/1994 | Evans |
| 5,400,211 A | 3/1995 | Evans |
| 5,435,874 A | 7/1995 | Takeuchi et al. |
| 5,449,441 A | 9/1995 | Amor et al. |
| 5,457,862 A | 10/1995 | Sakata et al. |
| 5,469,325 A | 11/1995 | Evans |
| 5,473,503 A | 12/1995 | Sakata et al. |
| 5,543,249 A | 8/1996 | Takeuchi et al. |
| 5,559,667 A | 9/1996 | Evans |
| 5,571,640 A | 11/1996 | Takeuchi et al. |
| 5,652,474 A | 7/1997 | Wilshaw et al. |
| 5,726,118 A | 3/1998 | Ivey et al. |

(Continued)

OTHER PUBLICATIONS

Abstract of Article—*Formation of Dimpled Tantalum Surfaces from Electropolishing*, Ed-Sayed et al., J. Electrochem. Soc., vol. 154, Issue 12, pp. C728-C732 (2007).

(Continued)

*Primary Examiner* — Nguyen T Ha
(74) *Attorney, Agent, or Firm* — Dority & Manning, P.A.

(57) ABSTRACT

A porous substrate for use in a wide variety of applications, such as wet capacitors, is provided. The substrate is formed by subjecting a metal substrate to a voltage while in solution to initiate anodic formation of an oxide film. Contrary to conventional anodization processes, however, the newly created oxide quickly breaks down to once again expose the metal surface to the electrolytic solution. This may be accomplished in a variety of ways, such as by raising the voltage of the solution above a critical level known as the "breakdown voltage", employing a corrosive acid in the solution that dissolves the oxide, etc. Regardless of the mechanism employed, the nearly simultaneous process of oxide growth/breakdown results in the formation of a structure having pores arranged at substantially regular intervals. The resulting structure is highly porous and can exhibit excellent adhesion to electrochemically-active materials and stability in aqueous electrolytes.

33 Claims, 5 Drawing Sheets

U.S. PATENT DOCUMENTS

| | | | |
|---|---|---|---|
| 5,729,428 A | 3/1998 | Sakata et al. |
| 5,737,181 A | 4/1998 | Evans |
| 5,754,394 A | 5/1998 | Evans et al. |
| 5,776,628 A | 7/1998 | Kraft et al. |
| 5,786,980 A | 7/1998 | Evans |
| 5,812,367 A | 9/1998 | Kudoh et al. |
| 5,858,911 A | 1/1999 | Wellen et al. |
| 5,894,403 A | 4/1999 | Shah et al. |
| 5,920,455 A | 7/1999 | Shah et al. |
| 5,926,362 A | 7/1999 | Muffoletto et al. |
| 5,949,639 A | 9/1999 | Maeda et al. |
| 5,963,417 A * | 10/1999 | Anderson et al. ............. 361/503 |
| 5,973,913 A | 10/1999 | McEwen et al. |
| 5,982,609 A | 11/1999 | Evans |
| 6,037,077 A | 3/2000 | Nowaczyk |
| 6,094,339 A | 7/2000 | Evans |
| 6,096,391 A | 8/2000 | Muffoletto et al. |
| 6,110,622 A | 8/2000 | Frysz et al. |
| 6,191,936 B1 | 2/2001 | Webber et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,245,436 B1 | 6/2001 | Boyle et al. |
| 6,278,231 B1 | 8/2001 | Iwasaki et al. |
| 6,322,912 B1 | 11/2001 | Fife |
| 6,332,900 B1 | 12/2001 | Muffoletto et al. |
| 6,334,879 B1 | 1/2002 | Muffoletto et al. |
| 6,387,818 B1 | 5/2002 | Lopatin |
| 6,420,066 B1 | 7/2002 | Frustaci et al. |
| 6,455,108 B1 | 9/2002 | Muffoletto et al. |
| 6,461,759 B1 | 10/2002 | Miller et al. |
| 6,461,771 B1 | 10/2002 | Frysz et al. |
| 6,468,605 B2 | 10/2002 | Shah et al. |
| 6,560,089 B2 | 5/2003 | Miltich et al. |
| 6,576,524 B1 | 6/2003 | Evans et al. |
| 6,594,139 B2 | 7/2003 | Muffoletto et al. |
| 6,594,140 B1 | 7/2003 | Evans et al. |
| 6,599,580 B2 | 7/2003 | Muffoletto et al. |
| 6,603,654 B2 | 8/2003 | Rorvick et al. |
| 6,648,928 B2 | 11/2003 | Nielsen et al. |
| 6,652,729 B2 | 11/2003 | Melody et al. |
| 6,687,117 B2 | 2/2004 | Liu et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,727,022 B2 | 4/2004 | Gan et al. |
| 6,740,420 B2 | 5/2004 | Muffoletto et al. |
| 6,743,547 B2 | 6/2004 | Gan et al. |
| 6,761,728 B2 | 7/2004 | Harguth et al. |
| 6,788,523 B1 | 9/2004 | Hossick-Schott et al. |
| 6,790,561 B2 | 9/2004 | Gan et al. |
| 6,795,299 B2 | 9/2004 | Naito |
| 6,798,643 B2 | 9/2004 | Oyama et al. |
| 6,801,424 B1 | 10/2004 | Nielsen et al. |
| 6,802,951 B2 | 10/2004 | Hossick-Schott |
| 6,807,048 B1 | 10/2004 | Nielsen et al. |
| 6,819,544 B1 | 11/2004 | Nielsen et al. |
| 6,827,879 B2 | 12/2004 | Shinozaki et al. |
| 6,828,059 B2 | 12/2004 | Miller et al. |
| 6,842,328 B2 | 1/2005 | Schott et al. |
| 6,850,405 B1 | 2/2005 | Milcham et al. |
| 6,859,353 B2 | 2/2005 | Elliott et al. |
| 6,859,354 B2 | 2/2005 | Viste et al. |
| 6,885,546 B2 | 4/2005 | Naito |
| 6,888,717 B2 | 5/2005 | Kinard et al. |
| 6,893,777 B2 | 5/2005 | Probst |
| 6,896,782 B2 * | 5/2005 | Melody et al. ................. 205/50 |
| 6,939,774 B2 | 9/2005 | Viste et al. |
| 6,951,576 B1 | 10/2005 | Takeuchi |
| 6,963,482 B2 | 11/2005 | Breyen et al. |
| 6,965,510 B1 | 11/2005 | Liu et al. |
| 6,967,829 B2 | 11/2005 | Seitz et al. |
| 6,986,838 B2 | 1/2006 | Babic et al. |
| 7,000,297 B2 | 2/2006 | Frustaci et al. |
| 7,002,790 B2 | 2/2006 | Hossick-Schott et al. |
| 7,008,837 B2 * | 3/2006 | Won et al. ..................... 438/239 |
| 7,012,799 B2 | 3/2006 | Muffoletto et al. |
| 7,038,901 B2 | 5/2006 | Muffoletto et al. |
| 7,072,171 B1 | 7/2006 | Muffoletto et al. |
| 7,079,250 B2 | 7/2006 | Mukai |
| 7,079,377 B2 | 7/2006 | Schott et al. |
| 7,081,141 B2 | 7/2006 | Hossick-Schott et al. |
| 7,085,126 B2 | 8/2006 | Muffoletto et al. |
| 7,092,242 B1 | 8/2006 | Gloss et al. |
| 7,099,143 B1 | 8/2006 | Fife et al. |
| 7,110,240 B2 | 9/2006 | Breyen et al. |
| 7,116,547 B2 | 10/2006 | Seitz et al. |
| 7,116,548 B2 | 10/2006 | Satterfield, Jr. et al. |
| 7,131,988 B2 | 11/2006 | Harguth et al. |
| 7,168,142 B2 | 1/2007 | Nowaczyk |
| 7,169,284 B1 | 1/2007 | Jiang et al. |
| 7,171,267 B2 | 1/2007 | Harguth et al. |
| 7,177,140 B2 | 2/2007 | Clarke et al. |
| 7,224,575 B2 * | 5/2007 | Sherwood ..................... 361/508 |
| 7,224,576 B2 | 5/2007 | Hossick-Schott |
| 7,242,572 B2 | 7/2007 | Norton et al. |
| 7,244,279 B2 | 7/2007 | Seitz et al. |
| 7,256,982 B2 | 8/2007 | Lessner et al. |
| 7,271,994 B2 | 9/2007 | Stemen et al. |
| 7,273,781 B2 * | 9/2007 | Lee ............................... 438/253 |
| 7,289,314 B2 | 10/2007 | Kobayashi et al. |
| 7,314,685 B2 | 1/2008 | Brown et al. |
| 7,342,774 B2 | 3/2008 | Hossick-Schott et al. |
| 7,402,183 B1 | 7/2008 | Jiang |
| 7,456,073 B2 | 11/2008 | Fife et al. |
| 7,460,356 B2 | 12/2008 | Ning |
| 7,480,130 B2 * | 1/2009 | Fife et al. ...................... 361/516 |
| 7,483,260 B2 | 1/2009 | Ziarniak et al. |
| 7,499,260 B2 | 3/2009 | Schott et al. |
| 7,667,954 B2 | 2/2010 | Lessner et al. |
| 7,687,102 B2 | 3/2010 | Hossick-Schott et al. |
| 7,736,802 B1 | 6/2010 | Smyth |
| 7,785,741 B2 | 8/2010 | Viavattine |
| 2003/0047505 A1 | 3/2003 | Grimes et al. |
| 2004/0225327 A1 | 11/2004 | Norton et al. |
| 2004/0240152 A1 | 12/2004 | Schott et al. |
| 2004/0243183 A1 | 12/2004 | Norton et al. |
| 2005/0002147 A1 | 1/2005 | Nielsen et al. |
| 2005/0089711 A1 | 4/2005 | Hossick-Schott |
| 2005/0098242 A1 | 5/2005 | Hossick-Schott et al. |
| 2005/0177193 A1 | 8/2005 | Nielsen et al. |
| 2006/0028786 A1 | 2/2006 | Norton et al. |
| 2006/0091020 A1 | 5/2006 | Hossick-Schott et al. |
| 2006/0123609 A1 | 6/2006 | Norton et al. |
| 2006/0139850 A1 | 6/2006 | Rorvick et al. |
| 2006/0187616 A1 | 8/2006 | Norton et al. |
| 2006/0227496 A1 | 10/2006 | Schott et al. |
| 2007/0211412 A1 | 9/2007 | Fife et al. |
| 2007/0211413 A1 | 9/2007 | Fife et al. |
| 2007/0235342 A1 | 10/2007 | Matsuo et al. |
| 2007/0274025 A1 | 11/2007 | Lessner et al. |
| 2008/0068779 A1 | 3/2008 | Restorff et al. |
| 2008/0119897 A1 | 5/2008 | Norton et al. |
| 2008/0151474 A1 | 6/2008 | Ziarniak et al. |
| 2008/0229565 A1 | 9/2008 | Schott et al. |
| 2008/0232030 A1 | 9/2008 | Jones et al. |
| 2008/0232031 A1 | 9/2008 | Ning |
| 2008/0232032 A1 | 9/2008 | Jones et al. |
| 2009/0117457 A1 | 5/2009 | Davis et al. |
| 2010/0326967 A1 | 12/2010 | Freitag et al. |

OTHER PUBLICATIONS

Abstract of Article—*Self-Assembled Porous Tantalum Oxide Prepared in $H_2SO_4/HF$ Electrolyte*, Sieber et al., Electrochemical and Solid-State Letters, vol. 8, Issue 3, pp. J-10-J-12 (2005).

Article—*Microstructural Evaluations of Oxide Films during Spark Anodizing of Mg—Al Alloys in Alkaline Fluoride Electrolytes*, Wang et al., 212th Electrochemical Society Meeting, 1 page, Oct. 2007.

Seminar—9th Int'l Seminar on Double Layer Capacitors and Similar Energy Storage Devices (1999), Evans, et al., *Improved Capacitor Using Amorphous $RuO_2$*, Evans Capacitor Company, Deerfield Beach, FL.

Related U.S. Appl. No. 12/330,943.

* cited by examiner

SUBSTRATE FOR USE IN WET CAPACITORS

BACKGROUND OF THE INVENTION

Wet capacitors are increasingly being used in the design of circuits due to their volumetric efficiency, reliability, and process compatibility. Wet capacitors typically have a larger capacitance per unit volume than certain other types of capacitors, making them valuable in high-current, high power and low-frequency electrical circuits. One type of wet capacitor that has been developed is a wet electrolytic capacitor that includes a valve metal anode, a cathode, and a liquid electrolyte. The unit cell voltage in this type of capacitor is generally higher due to the formation of a dielectric metal oxide film over the anode surface. Wet electrolytic capacitors tend to offer a good combination of high capacitance with low leakage current. Another type of wet capacitor is a wet symmetric capacitor in which the anode and cathode are similar in terms of structure and composition. The unit cell voltage in this type of capacitor is generally low due to the inevitable decomposition of the electrolyte at high voltage. Whether electrolytic or symmetric, however, the cathodes of wet capacitors typically include a substrate and a coating that provides high capacitance through a faradic or non-faradic mechanism. To enhance the adhesion of such coatings, the substrate is sometimes mechanically and/or chemically etched. However, under certain conditions, such as in the in the presence of aqueous electrolytes, the coatings can still become easily detached.

As such, a need currently exists for an improved cathode for use in wet capacitors.

SUMMARY OF THE INVENTION

In accordance with one embodiment of the present invention, a wet capacitor is disclosed that comprises an anode, cathode, and a working electrolyte disposed between the cathode and anode. The cathode comprises an anodized metal substrate coated with an electrochemically-active material. The substrate contains a plurality of pores formed in a surface thereof, the pores having an average size of from about 10 to about 1500 nanometers.

In accordance with another embodiment, an electrically conductive cathode is disclosed that comprises an anodized metal substrate coated with a conductive polymer, wherein the substrate contains a plurality of pores formed in a surface thereof that have an average size of from about 20 to about 1000 nanometers. Further, in accordance with still another embodiment, a method for forming a cathode for use in a wet capacitor is disclosed. The method comprises immersing a metal substrate in an anodizing solution; applying a current at a first voltage to the metal substrate to effect anodic oxidation and form an anodized substrate containing an oxide film; and initiating a breakdown of the oxide film to form a plurality of pores in a surface of the anodized substrate that have an average size of from about 10 to about 1500 nanometers.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
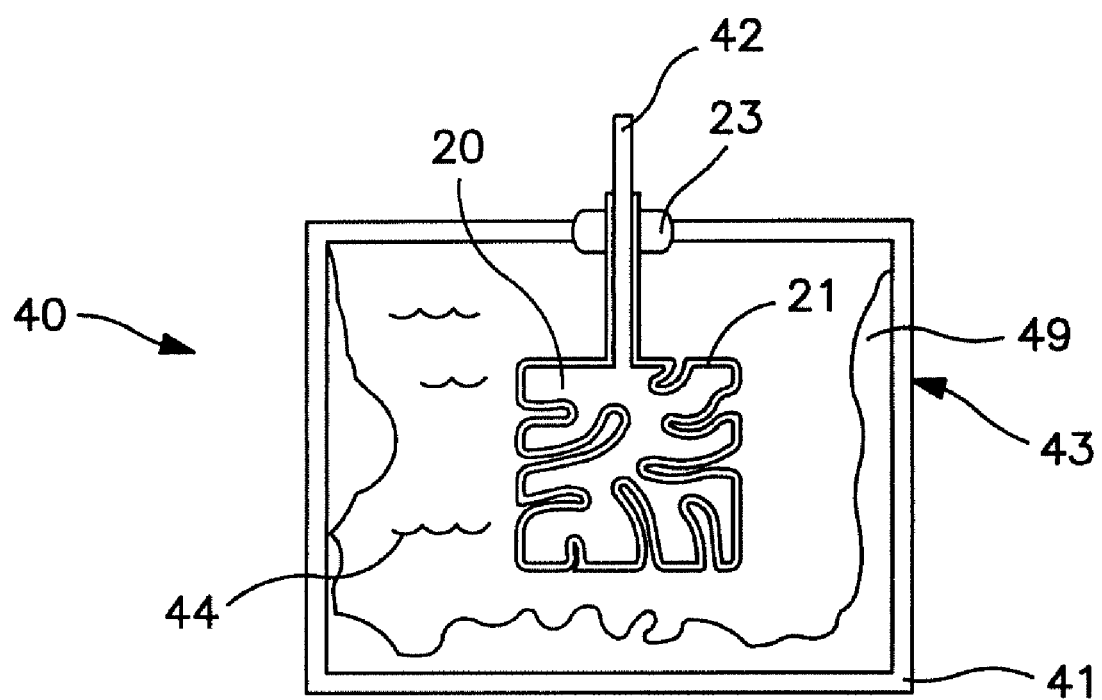
FIG. 1 is a cross-sectional view of one embodiment of a capacitor according to the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed a substrate for use in a wide variety of applications, such as wet capacitors. The substrate is formed by subjecting a metal substrate to a voltage while in solution to initiate anodic formation of an oxide film. Contrary to conventional anodization, however, the newly created oxide quickly breaks down to once again expose the metal surface to the electrolytic solution. This may be accomplished in a variety of ways, such as by raising the voltage of the solution above a critical level known as the "breakdown voltage", employing a corrosive acid in the solution that dissolves the oxide, etc. Regardless of the mechanism employed, the nearly simultaneous process of oxide growth/breakdown results in the formation of a structure having pores arranged at substantially regular intervals. The resulting structure is highly ordered and porous, and can exhibit excellent adhesion to electrochemically-active materials and stability in aqueous electrolytes.

The metal substrate may include any metal, such as tantalum, niobium, aluminum, nickel, hafnium, titanium, copper, silver, steel (e.g., stainless), alloys thereof, and so forth. The geometric configuration of the substrate may generally vary as is well known to those skilled in the art, such as in the form of a container, can, foil, sheet, screen, etc.

Any technique may be employed to contact the substrate with the anodizing solution, such as dipping, spraying, coating, etc. Regardless, the anodizing solution generally contains one or more ionic compounds (i.e., a compound that contains one or more ions or is capable of forming one or more ions in solution) to initiate anodic oxidation. Suitable ionic compounds may include, for instance, inorganic acids, such as nitric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The ionic conductivity of the solution is typically about 50 mS/cm or higher, in some embodiments about 100 mS/cm or higher, and in some embodiments, from about 125 to about 1000 mS/cm.

A current (e.g., DC current) may be applied to the solution at a voltage (e.g., positive voltage) that is below the critical "breakdown" level (the oxide "formation" stage) such that the oxide film can initially grow at a substantially linear rate. The actual amount of voltage applied during this stage may vary based on the nature of the substrate, the nature of the solution, the thickness of the dielectric film desired, and the current density, but is typically within a range of from about 1 Volt to about 140 Volts, in some embodiments from about 5 Volts to about 130 Volts, and in some embodiments, from about 10 Volts to about 120 Volts. The voltage level may vary (e.g., increasing) or remain constant within this range.

As indicated above, a variety of mechanisms may be employed in the present invention to initiate the breakdown of the formed oxide to create pores. In one embodiment, for example, the voltage is increased after the "formation" stage to a level above the critical breakdown voltage ("breakdown" stage) to initiate the alternating processes of oxide formation and breakdown as described above. This may occur, for instance, at a constant current or as a pulsed voltage. The critical breakdown voltage is often within a range of from about 45 Volts to about 200 Volts, in some embodiments from about 50 Volts to about 140 Volts, and in some embodiments, from about 55 Volts to about 130 Volts. Within the "breakdown" stage, the voltage level may vary (e.g., increasing) or remain constant. In one embodiment, for example, the voltage level is increased incrementally within the "breakdown" stage to allow enough time for partial or complete recovery of the oxide film. Such incremental increases may be no more than about 50%, in some embodiments no more than about 25%, and in some embodiments, no more than about 10% of the existing voltage. For example, the incremental increases (s) may be not more than about 30 Volts, in some embodiments not more than about 15 Volts, and in some embodiments, not more than about 5 Volts above the existing voltage.

Instead of simply raising the voltage, it should also be understood that known reverse pulse voltage techniques may be also used to initiate alternating oxide film formation and breakdown processes. For example, a positive voltage may initially be employed in the oxide formation stage and a negative voltage may be employed in the breakdown stage that reverses the polarity of the oxide to initiate breakdown.

Chemical compounds may also be employed to initiate breakdown of the oxide film. In one embodiment, for example, a corrosive acid or salt may be employed that dissolves the oxide film as it is formed. Examples of such corrosive compounds include, for instance, hydrofluoric acid, perchloric acid, hydroiodic acid, hydrobromic acid, hydrochloric acid, sulfuric acid, ammonium fluoride, sodium fluoride, potassium fluoride, etc. When employed, it is desirable to control the amount of the corrosive acid in the anodizing solution so that the breakdown of the oxide film is not too extensive. In this regard, the weight ratio of the ionic compound(s) to the corrosive acid(s) employed in the anodizing solution is typically from about 5:1 to about 50:1, in some embodiments from about 10:1 to about 40:1, and in some embodiments, from 12:1 to about 25:1.

Other parameters may also be controlled to achieve the desired level of porosity in the substrate. The temperature of the anodizing solution during the formation and/or breakdown stages may be, for example, near room temperature, such as from about 10° C. to about 50° C., in some embodiments from about 15° C. to about 40° C., and in some embodiments, from about 20° C. to about 30° C. The current density is also typically from about 0.005 to about 0.5 A/cm$^2$, in some embodiments from about 0.08 to about 0.3 A/cm$^2$, and in some embodiments, from about 0.01 to about 0.1 A/cm$^2$. The temperature and current density may vary or remain constant within the formation and/or breakdown stages.

If desired, the porous substrate may also be subjected to a heating step to minimize the oxidation of the metal substrate. The temperature at which the substrate is heated depends on the type of components employed in the anode body. For example, the substrate is typically heated by an oven that operates at a temperature of from about 200° C. to about 1400° C., in some embodiments from about 300° C. to about 1200° C., and in some embodiments, from about 400° C. to about 1000° C. Such heating may occur for about 5 to about 300 minutes, in some embodiments from about 10 to about 200 minutes, and in some embodiments, from about 15 minutes to about 90 minutes. Heat treatment also typically occurs in a reducing atmosphere, such as in a vacuum, inert gas, hydrogen, etc. If desired, a getter material may also be employed that can bind to any oxygen atoms removed during heat treatment to further enhance conductivity, such as tantalum, niobium, carbon, magnesium, etc. or combinations thereof.

As a result of the process described above, a metal substrate is formed that is highly porous. The pores have a size small enough to effectively increase the surface area of the substrate, yet large enough that an electrochemically-active material can pass therethrough. In this regard, the average size of the pores is typically from about 10 to about 1500 nanometers, in some embodiments from about 20 to about 1000 nanometers, and in some embodiments, from about 50 to about 500 nanometers. The shape of the pores may be circular, tubular, square, rectangular, etc. When employed, the depth of such tubular pores may, for example, range from about 10 to about 800 nanometers, in some embodiments from about 20 to about 600 nanometers, and in some embodiments, from about 30 to about 400 nanometers. Besides the size and shape of the pores, the degree of porosity may also be controlled. For instance, the pores may constitute from about 10% to about 90%, in some embodiments from about 20% to about 80%, and in some embodiments, from about 30% to about 70% of the surface of the substrate.

Furthermore, to the extent any oxide film still remains on the surface of the substrate after the breakdown process, it is extremely thin in nature and does not form a continuous coating over the surface. That is, the surface is defined by regions of both metal and oxide-coated metal. For this reason, the porous substrate can remain highly conductive. The extent of conductivity may be characterized in terms of the "resistivity" at about 20° C., which is generally less than about 1 ohm-cm, in some embodiments less than about $1\times10^{-2}$ ohm-cm, in some embodiments less than about $1\times10^{-3}$ ohm-cm, and in some embodiments, less than about $1\times10^{-4}$ ohm-cm. Although conductive, the substrate may nevertheless be coated with an additional layer of a conductive material to further improve the surface conductivity. Examples of such materials may include metals, such as gold, platinum, palladium, copper, silver, etc.

Once formed, an electrochemically-active material is applied to the porous substrate to increase the effective surface area over which the electrolyte electrochemically communicates with the substrate. Such an increased effective surface area allows for the formation of capacitors with increased cathode capacitance for a given size and/or capacitors with a reduced size for a given capacitance. Any of a variety of known electrochemically-active materials may generally be employed. In one embodiment, for example, a conductive polymer may be employed, such as a polypyrrole; polythiophene, such as poly(3,4-ethylenedioxythiophene) (PEDT); polyaniline; polyacetylene; poly-p-phenylene; derivatives thereof; and so forth. As is known in the art, such conductive polymers may be formed from a monomer that polymerizes to assume an amorphous, non-crystalline form, which appears somewhat like a web when viewed under scanning electron microscopy. This means that the resultant conductive polymer coating has a high surface area and therefore acts to increase the effective surface area of the substrate to which it is applied.

The conductive polymer coating may contain one or multiple conductive polymer layers and be formed using a variety of known techniques. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. One suitable polymerization catalyst is CLEVIOS C (Bayer Corp.), which is iron (III) toluene-sulphonate and n-butanol. CLEVIOS C is a commercially available catalyst for CLEVIOS M, which is 3,4-ethylenedioxythiophene, a PEDT monomer also sold by Bayer Corporation. Once a dispersion is formed, the substrate may then be dipped into the dispersion so that the conductive polymer forms. Alternatively, the catalyst and monomer(s) may also be applied separately. For example, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to or in lieu of conductive polymers, metals, such as metal particles formed from ruthenium, iridium, nickel, rhodium, rhenium, cobalt, tungsten, manganese, tantalum, niobium, molybdenum, lead, titanium, platinum, palladium, and osmium, as well as combinations of these metals, may also be employed. In one particular embodiment, for example, the electrochemically-active material includes palladium particles. Non-insulating oxide particles may also be employed in the present invention. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al.; U.S. Pat. No. 5,858,911 to Wellen, et al.; as well as U.S. Patent Application Publication No. 2003/0158342 to Shinozaki, et al., all of which are incorporated herein in their entirety by reference thereto for all purposes.

If desired, a binder may sometimes be employed to help adhere the electrochemically-active material to the substrate. Any binder that provides the requisite level of adhesive strength may be used. For example, suitable binders may include polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins. A conductive filler may also be employed in some embodiments to further enhance the conductivity of the electrochemically-active material. Such conductive fillers may be particularly beneficial in counteracting any loss of conductivity that might result from a binder covering a portion of the surface of the electrochemically-active material. Any suitable conductive filler may be employed, such as metallic particles (e.g., silver, copper nickel, aluminum, and so forth); non-metallic particles (e.g., carbon black, graphite, and so forth).

As a result of the present invention, electrodes may be formed that have a relatively high specific capacitance. For example, the specific capacitance of the electrode may be about 10 milliFaradays per square centimeter ("$mF/cm^2$") or more, in some embodiments about 15 $mF/cm^2$ or more, and in some embodiments, from about 25 to about 100 $mF/cm^2$, as determined in a 5.0 M $H_2SO_4$ solution at a frequency of 120 Hz. The high capacitance values may be achieved even at a relatively low total thickness of about 100 micrometers or less, in some embodiments about 75 micrometers or less, and in some embodiments, from about 10 to about 50 micrometers. Such thin, high capacitance electrodes are well suited for use in a wide variety of applications, including symmetrical and non-symmetrical wet capacitors, batteries, and so forth. In one embodiment, for example, the cathode may be employed in a non-symmetrical wet electrolytic capacitor that includes an anode, cathode, and a working electrolyte disposed therebetween and in contact with the anode and the cathode. In this regard, various embodiments of such wet electrolytic capacitors that may be formed according to the present invention will now be described in more detail. It should be understood that the description below is merely exemplary, and multiple other embodiments are also contemplated by the present invention.

The anode of the wet electrolytic capacitor may generally be formed from a variety of different materials. For example, the anode may be formed from a powder constituted primarily by a valve metal (i.e., metal that is capable of oxidation) or from a composition that contains the valve metal as a component. Suitable valve metals that may be used include, but are not limited to, tantalum, niobium, aluminum, hafnium, titanium, alloys of these metals, and so forth. For example, the anode may be formed from a valve metal oxide or nitride (e.g., niobium oxide, tantalum oxide, tantalum nitride, niobium nitride, etc.) that is generally considered a semi-conductive or highly conductive material. Particularly suitable valve metal oxides for use in the anode include niobium oxides having an atomic ratio of niobium to oxygen of 1:less than 2.5, in some embodiments 1:less than 1.5, in some embodiments 1:less than 1.1, and in some embodiments, 1:1.0±0.2. For example, the niobium oxide may be $Nb_{0.7}$, $NbO_{1.0}$, $NbO_{1.1}$, and $NbO_2$. Additional examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

A variety of conventional fabricating procedures may generally be utilized to form the anode. For example, the anode may be formed as a foil, pressed powder, etc. as is well known in the art. Exemplary pressed powder anodes are described, for instance, in U.S. Pat. No. 7,099,143 to Fife, et al., which is incorporated herein in its entirety by reference thereto for all purposes. Alternatively, the anode may be formed from ceramic particles (e.g., $Nb_2O_5$, $Ta_2O_5$) that are chemically reduced to form an electrically conductive material (e.g., NbO, Ta). For instance, a slip composition containing the ceramic particles may be initially formed and deposited onto a substrate in the form of a thin layer. If desired, multiple layers may be formed to achieve the target thickness for the anode. Once formed, the layer(s) may be subjected to a heat treatment to chemically reduce the ceramic particles and form the electrically conductive anode. Such slip-formed anodes may exhibit a small thickness, high aspect ratio (i.e., ratio of width to thickness), and uniform density, which may in turn lead to an improved volumetric efficiency and equivalent series resistance ("ESR"). For example, the anodes may have a thickness of about 1500 micrometers or less, in some embodiments about 1000 micrometers or less, and in some embodiments, from about 50 to about 500 micrometers. Likewise, the anodes may have an aspect ratio of about 1 or more, in some embodiments about 5 or more, and in some embodiments, about 15 or more.

The anode may possess any desired shape, such as square, rectangle, circle, oval, triangle, etc. Polygonal shapes having more than four (4) edges (e.g., hexagon, octagon, heptagon, pentagon, etc.) are particularly desired due to their relatively high surface area. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Once formed, the anode may be anodized so that a dielectric film is formed over and within the anode. For example, a niobium oxide (NbO) anode may be anodized to form niobium pentoxide ($Nb_2O_5$). Specifically, in one embodiment, the niobium oxide anode is dipped into a weak acid solution (e.g., phosphoric acid, polyphosphoric acid, mixtures thereof, and so forth) at an elevated temperature (e.g., about 85° C.) that is supplied with a controlled amount of voltage and current to form a niobium pentoxide coating having a certain thickness. The power supply is initially kept at a constant current until the required formation voltage is reached. Thereafter, the power supply is kept at a constant voltage to ensure that the desired dielectric thickness is formed over the surface of the anode. The anodization voltage typically ranges from about 10 to about 200 Volts, and in some embodiments, from about 20 to about 100 Volts. In addition to being formed on the surface of the anode, a portion of the dielectric oxide film will also typically form on the surfaces of the pores of the material. It should be understood that the dielectric film may be formed from other types of materials and using different techniques.

The working electrolyte is the electrically active material that provides the connecting path between the anode and cathode, and is generally in the form of a liquid, such as a solution (e.g., aqueous or non-aqueous), dispersion, gel, etc. For example, the working electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable working electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

In one particular embodiment, the electrolyte is relatively neutral and has a pH of from about 3.0 to about 8.0, in some embodiments from about 4.0 to about 7.5, and in some embodiments, from about 5.0 to about 7.5. Despite possessing a neutral pH level, the electrolyte is nevertheless electrically conductive. For instance, the electrolyte may have an electrical conductivity of about 10 or more milliSiemens per centimeter ("mS/cm"), in some embodiments about 30 mS/cm or more, and in some embodiments, from about 40 mS/cm to about 100 mS/cm, determined at a temperature of 25° C. The value of electric conductivity may obtained by using any known electric conductivity meter (e.g., Oakton Con Series 11) at a temperature of 25° C.

The working electrolyte may include a variety of components that help optimize its conductivity, pH, and stability during storage and use of the capacitor. For instance, a solvent is generally employed that functions as a carrier for the other components of the electrolyte. The solvent may constitute from about 30 wt. % to about 90 wt. %, in some embodiments from about 40 wt. % to about 80 wt. %, and in some embodiments, from about 45 wt. % to about 70 wt. % of the electrolyte. Any of a variety of solvents may be employed, such as water (e.g., deionized water); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although not necessarily required, the use of an aqueous solvent (e.g., water) is often desired to help maintain the pH of the electrolyte at a relatively neutral level. In fact, water may constitute about 50 wt. % or more, in some embodiments, about 70 wt. % or more, and in some embodiments, about 90 wt. % to 100 wt. % of the solvent(s) used in the electrolyte.

The electrical conductivity of the working electrolyte may be imparted by one or more ionic compounds, such as described above. The concentration of ionic compounds is selected to achieve the desired balance between electrical conductivity and pH. That is, a strong acid (e.g., phosphoric acid) may be employed as an ionic compound, although its concentration is typically limited to maintain the desired neutral pH level. When employed, strong acids normally constitute from about 0.001 wt. % to about 5 wt. %, in some embodiments from about 0.01 wt. % to about 2 wt. %, and in some embodiments, from about 0.1 wt. % to about 1 wt. % of the electrolyte. Weak acids (e.g., acetic acid), on the other hand, may be employed so long as the desired electrical conductivity is achieved. When employed, weak acids normally constitute from about 1 wt. % to about 40 wt. %, in some embodiments from about 2 wt. % to about 30 wt. %, and in some embodiments, from about 5 wt. % to about 25 wt. % of the electrolyte. If desired, blends of weak and strong acids may be employed in the electrolyte. The total concentration of ionic compounds may vary, but is typically from about 1 wt. % to about 50 wt. %, in some embodiments from about 2 wt. % to about 40 wt. %, and in some embodiments, from about 5 wt. % to about 30 wt. % of the electrolyte.

If desired, basic pH modifiers may also be used in the electrolyte in an amount effective to balance the effect of the ionic compounds on pH. Suitable basic pH modifiers may include, but are not limited to, ammonia; mono-, di-, and tri-alkyl amines; mono-, di-, and tri-alkanolamines; alkali metal and alkaline earth metal hydroxides; alkali metal and alkaline earth metal silicates; and mixtures thereof. Specific examples of basic pH modifiers are ammonia; sodium, potassium, and lithium hydroxide; sodium, potassium, and lithium meta silicates; monoethanolamine; triethylamine; isopropanolamine; diethanolamine; and triethanolamine.

To ensure that the electrolyte remains stable during conditions of normal storage and use, it is generally desired that its freezing point is about −20° C. or less, and in some embodiments, about −25° C. or less. If desired, one or more freezing point depressants may be employed, such as glycols (e.g., propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); and so forth. Although the concentration of the freezing point depressant may vary, it is typically present in an amount of from about 5 wt. % to about 50 wt. %, in some embodiments from about 10 wt. % to about 40 wt. %, and in some embodiments, from about 20 wt. % to about 30 wt. % of the electrolyte. It should also be noted that the boiling point of the electrolyte is typically about 85° C. or more, and in some embodiments, about 100° C. or more, so that the electrolyte remains stable at elevated temperatures.

A depolarizer may also be employed in the working electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte.

Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

The physical arrangement of the anode, cathode, and working electrolyte of the capacitor may generally vary as is well known in the art. Referring to FIG. 1, for example, one embodiment of a wet electrolytic capacitor 40 is shown that includes a working electrolyte 44 disposed between an anode 20 and a cathode 43. The anode 20 contains a dielectric film 21 and is embedded with a lead 42 (e.g., tantalum wire). The cathode 43 is formed from a porous cathode substrate 41, such as described above, and an electrochemically-active material 49. Although not shown, a separator may be positioned between the cathode 43 and anode 20 to prevent direct contact between the anode and cathode, yet permit ionic current flow of working electrolyte 44 to the electrodes. Any material employed as a separator in known electrolytic-type may be used as a separator in the present invention. Examples include paper, plastic fibers, glass fibers, papers made of these fibers, porous membranes, and ion-permeable materials (e.g., Nafion™). Typically, the anode and cathode are separated by a distance of from about 10 micrometers to about 1000 micrometers. In this embodiment, the porous cathode substrate 41 is in the form of a cylindrically-shaped "can" with an attached lid. A seal 23 (e.g., glass-to-metal) may also be employed that connects and seals the anode 20 to the cathode 43. Although not shown, the capacitor 40 may also include a spacer (not shown) that holds the anode 20 steady within the cathode 43. The spacer may, for example, be made of plastic and may be washer-shaped.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 800 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 1000 Hz.

The present invention may be better understood by reference to the following examples.

EXAMPLE 1

The ability to form a cathode in accordance with the present invention was demonstrated. Initially, a sheet of grade #1 titanium (thickness of 120 μm, Sigma-Aldrich) was cut into two squares having a width of 10.0 millimeters for use as the metal substrates. The squares were roughened with No. 220 sand paper to remove all the visible stains and discoloration on the surface. Thereafter, a 15-mm long tantalum wire was spot-welded to the center of an upper edge of the square to facilitate subsequent processing and electrical measurements. These samples were then degreased in soap water in an ultrasonic bath for 60 minutes, rinsed 5 times in deionized water, and then vacuum dried at a temperature of 50° C. and gauge pressure of –26" Hg for more than 2 hours.

Figure 2:
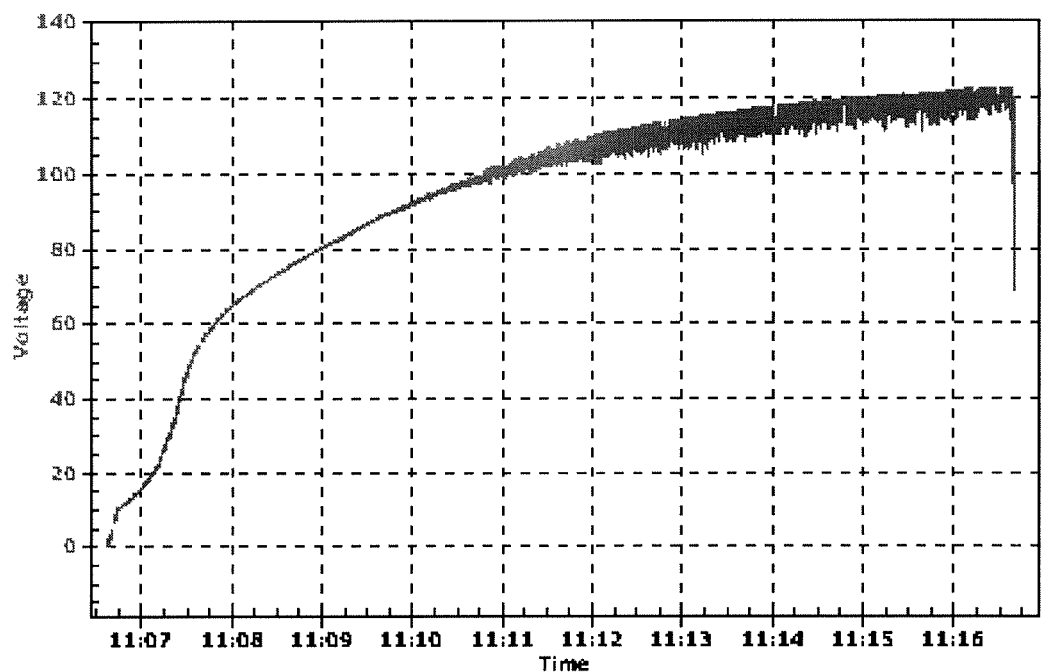
FIG. 2 is a graphical depiction of the voltage profile used in Example 1.
Figure 3:
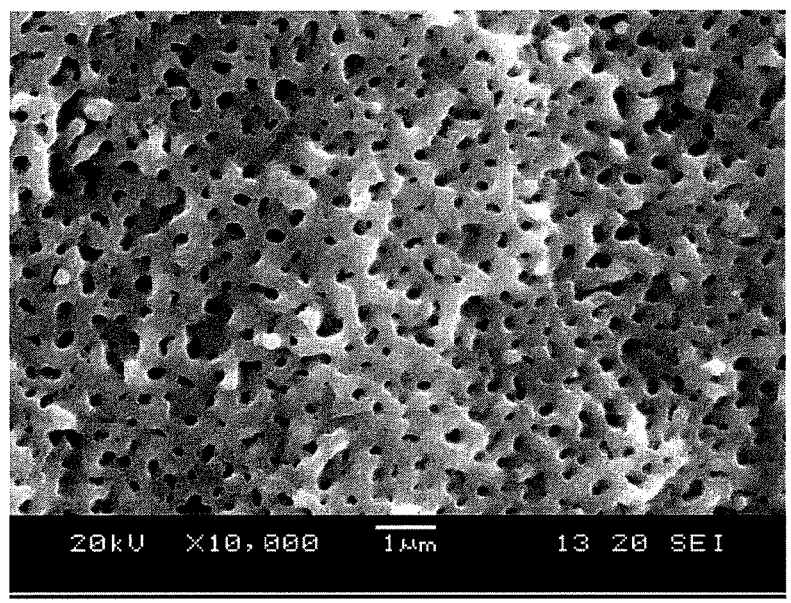
FIG. 3 is an SEM photograph (20 kV, 10,000×) of the substrate formed in Example 1.

To form the porous surface, the two samples were dipped into a solution of 1.0 M $H_2SO_4$. An electrochemical cell was created using a titanium sample as prepared above as the anode and a piece of platinum gauze as the cathode. Anodic oxidation of the metal substrate was initiated by passing a DC current through the electrochemical cell at a density of 0.05 $A/cm^2$. After 10 minutes, the samples were removed, rinsed 5 times with deionized water, and dried at room temperature for one (1) hour. The voltage profile used during anodization is shown in FIG. 2. As illustrated, the voltage profile contained two distinctive regions—oxide film formation region (lower than 60 V) and oxide film breakdown region (higher than 60 V). A photograph of one of the resulting porous substrates is shown in FIG. 3. As shown, a mesh structure was formed through electrochemical treatment having a pore size ranging from about 100 to about 1000 nanometers (0.1 to 1 μm).

In-situ converted poly (3,4-ethylenedioxythiophene) was then formed by sequentially coating the substrate in CLEVIOS® M monomer and CLEVIOS® CB catalyst. Ethanol was used for cleaning, and drying was controlled at room temperature for more than 2 hours. To determine cathode capacitance, a standard cylindrical tantalum anode was employed that was pressed to a diameter of 6.5 mm and height of 20.0 mm. The anode was anodized to show an intrinsic capacitance of 2.62 mF at a frequency of 120 Hz. The conductive-polymer coated titanium substrate was used as the cathode. The electrolyte was 5.0 M $H_2SO_4$. A 4021 Agilent LCR meter was used under $C_s$—$R_s$ mode with bias at 2.0 V, frequency at 120 Hz and AC peak voltage at 1.0 V. To calculate cathode capacitance, the following formula was used:

$$\frac{1}{C_{cathode}} = \frac{1}{C_{cell}} - \frac{1}{C_{anode}}$$

Using this formula, it was determined that the two samples had the specific cathode capacitance of 37.52 $mF/cm^2$ and 31.79 $mF/cm^2$. For stability testing, one of the samples was also soaked in an aqueous solution with a pH of 6.25 at 70° C. No delamination between the PEDT coating and the metal substrate or dislodged PEDT particles was found after 90 days.

EXAMPLE 2

Figure 4:
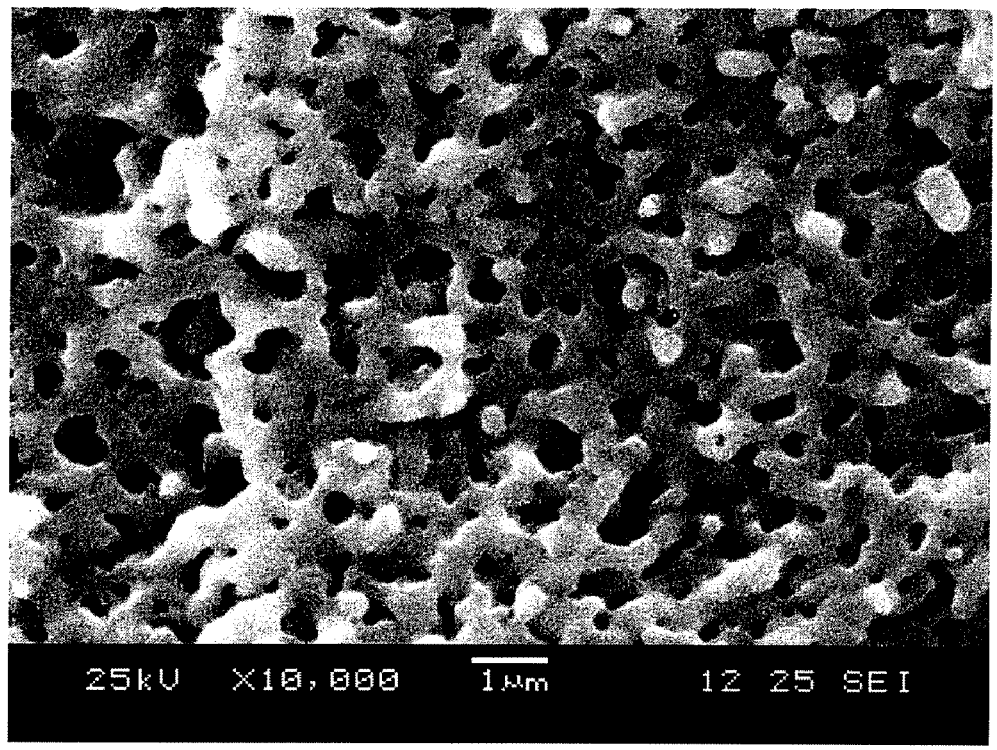
FIG. 4 is an SEM photograph (25 kV, 10,000×) of the substrate formed in Example 2.

Two (2) titanium samples were prepared as described in Example 1, except that the mesh structure was modified prior to application of the PEDT coating by heat treating in an argon atmosphere at a temperature of 750° C. for 30 minutes. The resulting structure is shown in FIG. 4. As indicated, the surface remained highly porous, although pores larger than 1,000 nanometers (1 μm) did occur at certain locations. The specific cathode capacitance of the samples was determined to be 16.44 $mF/cm^2$ and 33.50 $mF/cm^2$.

EXAMPLE 3

Figure 5:
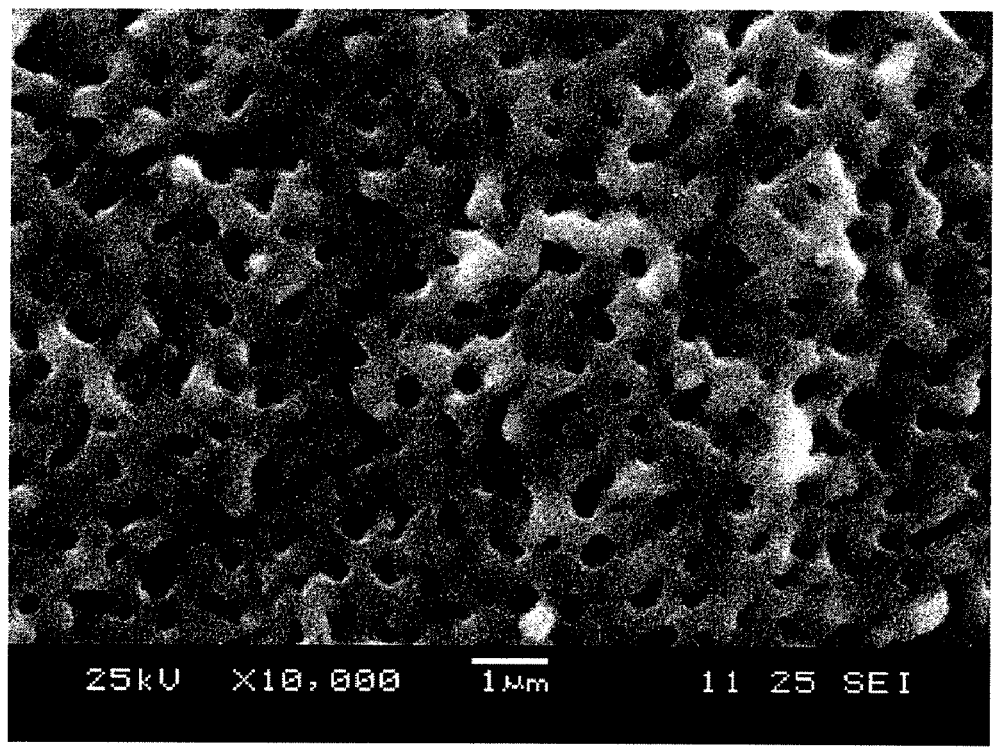
FIG. 5 is an SEM photograph (25 kV, 10,000×) of the substrate formed in Example 3.

Two (2) titanium samples were prepared as described in Example 1, except that the mesh structure was modified prior to application of the PEDT coating by heat treating in an argon atmosphere at a temperature of 750° C. for 30 minutes in the presence of 1 gram of magnesium turnings. The resulting structure is shown in FIG. 5. The color of the surface changed from gray to black, which was possibly due to the formation of a titanium-magnesium alloy. Regardless, as shown, the surface remained highly porous and ordered. The specific cathode capacitance of the samples was determined to be 24.80 $mF/cm^2$ and 21.05 $mF/cm^2$.

EXAMPLE 4

Figure 6:
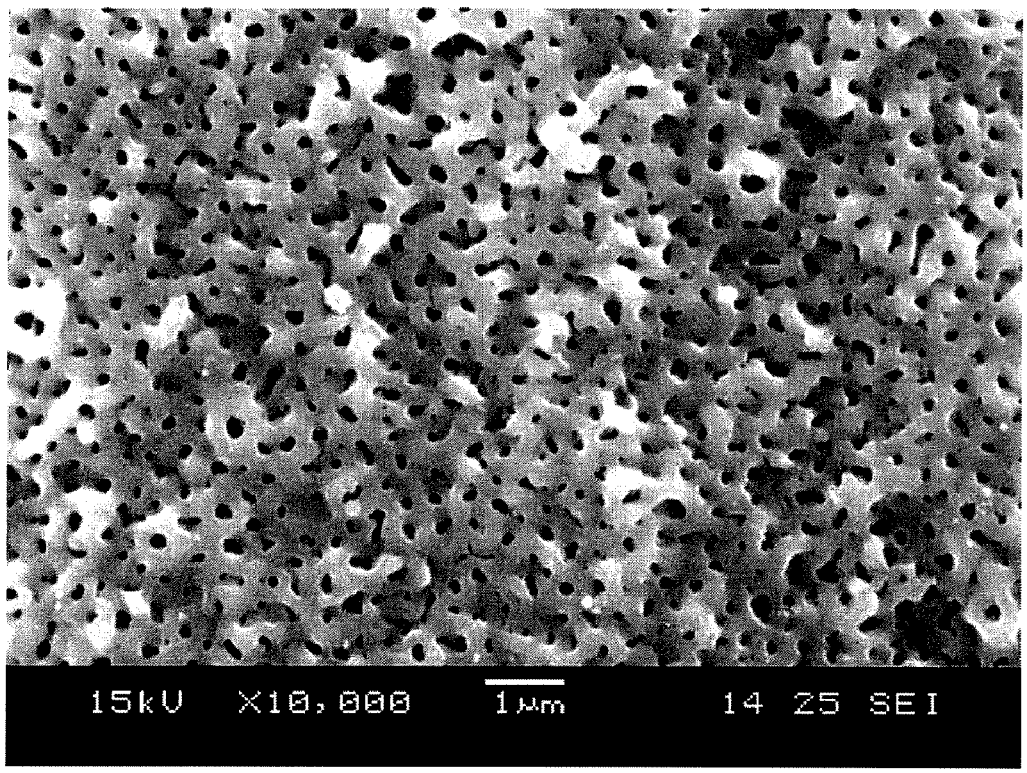
FIG. 6 is an SEM photograph (15 kV, 10,000×) of the substrate formed in Example 4.

Four (4) titanium samples were prepared as described in Example 1, except that the mesh structure was modified prior to application of the PEDT coating by heat treating in an argon atmosphere at a temperature of 600° C. for 30 minutes in the presence of graphite flakes (Alfa Aesar, median size of 7-10 μm). The resulting structure is shown in FIG. 6. As shown, the surface remained highly porous and ordered. The specific cathode capacitance of the samples was determined to be 30.79 $mF/cm^2$, 26.61 $mF/cm^2$, 30.79 $mF/cm^2$ and 27.88 $mF/cm^2$.

EXAMPLE 5

The ability to form a cathode in accordance with the present invention was demonstrated. Initially, a sheet of grade #1 titanium (thickness of 120 μm, Sigma-Aldrich) was cut into two squares having a width of 10.0 millimeters for use as the metal substrates. The squares were roughened with No. 220 sand paper to remove all the visible stains and discoloration on the surface. Thereafter, a 15-mm long tantalum wire was spot-welded to the center of an upper edge of the square to facilitate subsequent processing and electrical measurements. These samples were then degreased in soap water in an ultrasonic bath for 60 minutes, rinsed 5 times in deionized water, and then vacuum dried at a temperature of 50° C. and gauge pressure of –26" Hg for more than 2 hours.

Figure 7:
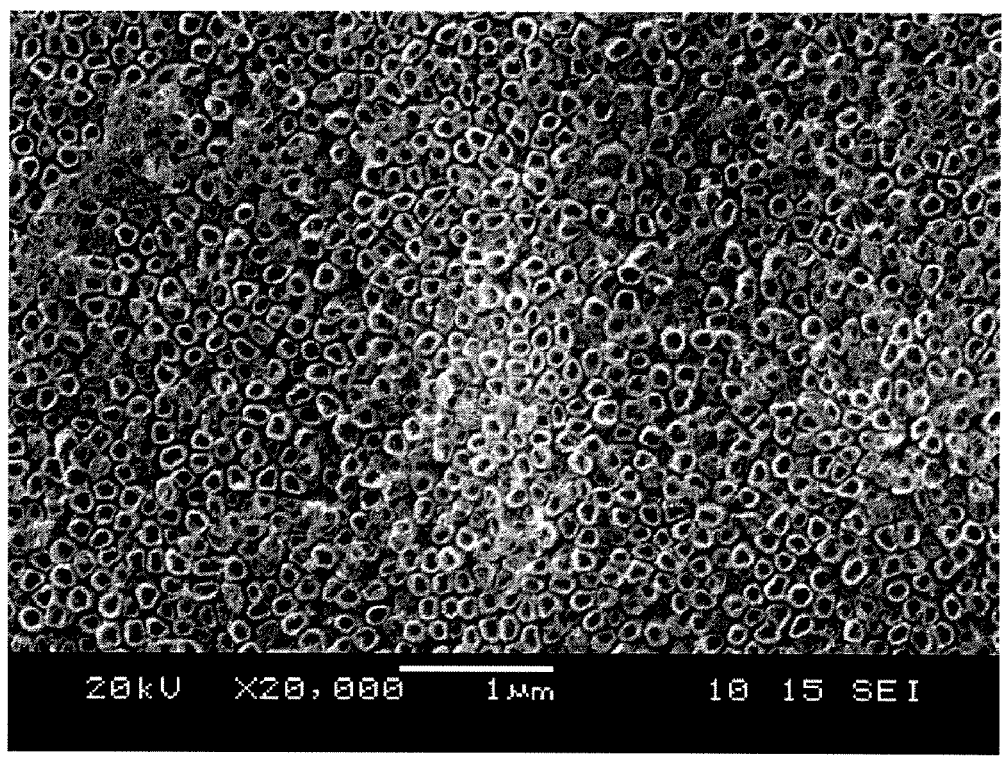
FIG. 7 is an SEM photograph (20 kV, 10,000×) of the substrate formed in Example 5.

To form the porous surface, the two samples were dipped into a 100 ml beaker containing a solution prepared by mixing 11.3 grams of phosphoric acid, 0.625 grams of hydrofluoric acid, 45 ml of ethylene glycol, and 45 ml of deionized water. An electrochemical cell was created using a titanium sample as prepared above as the anode and a piece of platinum gauze as the cathode. Anodic oxidation of the metal substrate was initiated by passing a DC current through the electrochemical cell at a density of 0.02 $A/cm^2$. The current was passed through the electrochemical cell to reach 25 Volts and then held at 25 Volts for 10 minutes. After 10 minutes, the samples were removed, rinsed 5 times with deionized water, and dried at room temperature for one (1) hour. The sample was then heat treated for one hour in air at 450° C. to achieve phase change from anatase to rutile. A photograph of one of the resulting porous substrates is shown in FIG. 7. As shown, a tube structure was formed through electrochemical treatment having a pore size ranging from about 50 to about 300 nanometers (0.05 to 0.3 μm). The estimated depth of the tubes was about 70 nanometers based on a formation constant of 2.8 nm/V.

In-situ converted poly(3,4-ethylenedioxythiophene) was then formed by sequentially coating the substrate in CLEVIOS® M monomer and CLEVIOS® CB catalyst. Ethanol was used for cleaning, and drying was controlled at room temperature for more than 2 hours. It was determined that the resulting samples had a specific cathode capacitance of 37.52 mF/cm$^2$ and 31.79 mF/cm$^2$.

EXAMPLE 6

Figure 8:
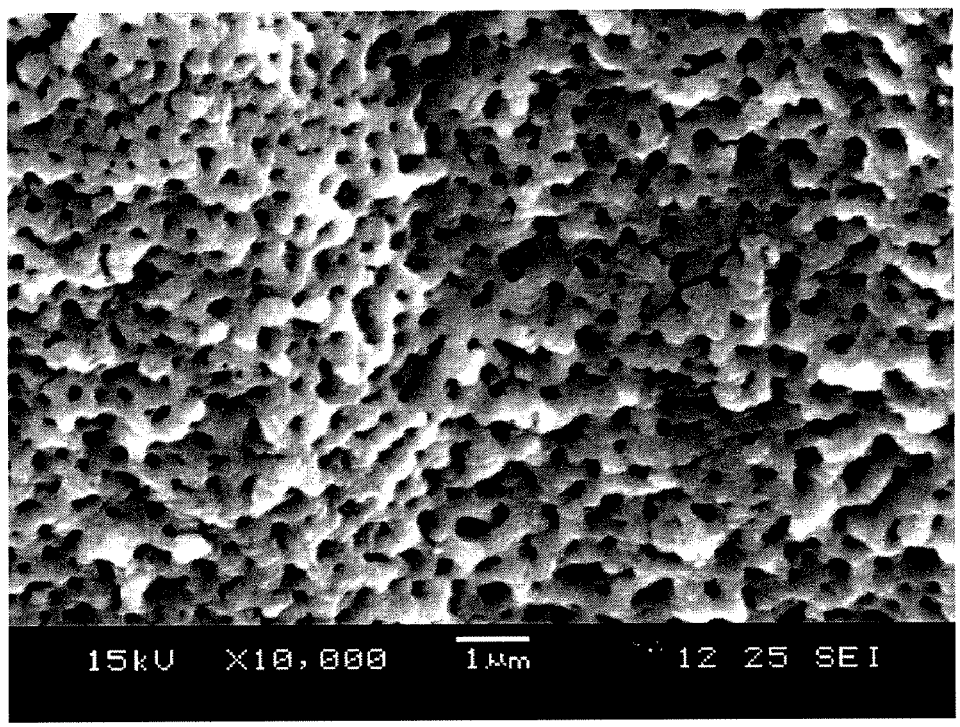
FIG. 8 is an SEM photograph (15 kV, 10,000×) of the substrate formed in Example 6.

Two (2) titanium samples were prepared as described in Example 1, except that the mesh structure was modified prior to application of the PEDT coating by heat treating in a hydrogen atmosphere at a temperature of 600° C. for 30 minutes and then in a vacuum (10$^{-5}$ torr) at 700° C. for 20 minutes. The resulting structure is shown in FIG. 8. As shown, the surface remained highly porous and ordered. The specific cathode capacitance of the samples was determined to be 36.36 mF/cm$^2$ and 32.46 mF/cm$^2$, respectively.

EXAMPLE 7

Two (2) titanium samples were prepared as described in Example 1, except that the mesh structure was modified prior to application of the PEDT coating by gold sputtering for 15 seconds in a vacuum chamber set at a pressure of 200 millitorr. The specific cathode capacitance of the samples was determined to be 29.27 mF/cm$^2$ and 38.66 mF/cm$^2$, respectively.

EXAMPLE 8

The ability to form a cathode in accordance with the present invention was demonstrated. Initially, a sheet of tantalum (thickness of 250 μm, H. C. Starck) was cut into two squares having a width of 10.0 millimeters for use as the metal substrates. The squares were roughened with No. 220 sand paper to remove all the visible stains and discoloration on the surface. Thereafter, a 15-mm long tantalum wire was spot-welded to the center of an upper edge of the square to facilitate subsequent processing and electrical measurements. These samples were then degreased in soap water in an ultrasonic bath for 60 minutes, rinsed 5 times in deionized water, and then vacuum dried at a temperature of 50° C. and gauge pressure of −26" Hg for more than 2 hours.

Figure 9:
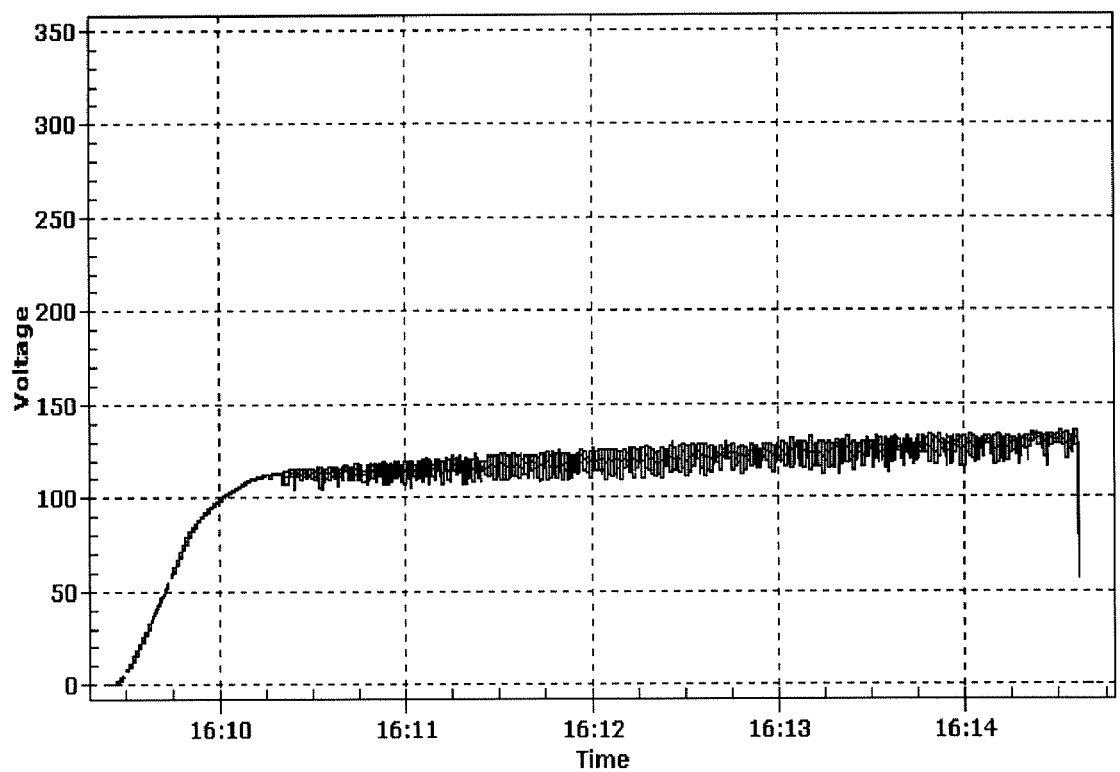
FIG. 9 is a graphical depiction of the voltage profile used in Example 8.

To form the porous surface, the two samples were dipped into a solution of 1.0 M H$_2$SO$_4$ mixed with 10 vol. % HF at a ratio of 9 to 1 on a volume basis. An electrochemical cell was created using a tantalum sample as prepared above as the anode and a piece of platinum gauze as the cathode. Anodic oxidation of the metal substrate was initiated by passing a DC current through the electrochemical cell at a density of 0.05 A/cm$^2$. After 5 minutes, the samples were removed, rinsed 5 times with deionized water, and dried at room temperature for one (1) hour. The voltage profile used during anodization is shown in FIG. 9. As illustrated, the voltage profile contained two distinctive regions—oxide film formation region (lower than 100 V) and oxide film breakdown region (higher than 100 V, and ranging from 110 to 140 V). In-situ converted poly(3,4-ethylenedioxythiophene) was then formed by sequentially coating the substrate in CLEVIOS® M monomer and CLEVIOS® CB catalyst. Ethanol was used for cleaning, and drying was controlled at room temperature for more than 2 hours. It was determined that the two samples had the specific cathode capacitance of 15.83 mF/cm$^2$ and 12.62 mF/cm$^2$.

EXAMPLE 9

One (1) titanium sample was prepared as described in Example No. 1, except that the electrochemical-active material was not PEDT but electro-deposited palladium. A bath was prepared with PdCl$_2$ of 8.0 grams/liter and HCL of 1 mol/liter. Cathodic current density was controlled at 0.02 A/cm$^2$ for about 40 minutes with a piece of platinum mesh as anode. A uniform layer of palladium black was deposited on the converted titanium surface. The specific cathode capacitance was determined to be 5.46 mF/cm$^2$.

EXAMPLE 10

Two (2) titanium samples were prepared as described in Example No. 1 and were assembled face to face to form a symmetric capacitor with a piece of Celgard 3501 polypropylene separator in between. The whole assembly was tightened using heat shrink film and then vacuum-impregnated with 5.0 M H$_2$SO$_4$. For electrical testing, the bias was controlled at 0.6 V, the frequency was controlled at 120 Hz and the Peak AC voltage was controlled at 10 mV. The cell showed a capacitance of about 12.0 mF.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet capacitor comprising:
   an anode;
   a cathode comprising an anodized metal substrate coated with an electrochemically-active material, wherein the substrate contains a plurality of pores formed in a surface thereof, the pores having an average size of from about 10 to about 1500 nanometers; and
   a working electrolyte disposed between the cathode and the anode.

2. The wet capacitor of claim 1, wherein the metal substrate comprises titanium or an alloy thereof.

3. The wet capacitor of claim 1, wherein the pores have an average size of from about 20 to about 1000 nanometers.

4. The wet capacitor of claim 1, wherein the anodized substrate has a resistivity at about 20° C. of about 1×10$^{-4}$ ohm-cm or less.

5. The wet capacitor of claim 1, wherein the pores have a generally tubular shape.

6. The wet capacitor of claim 1, wherein pores constitute from about 30% to about 70% of a surface of the substrate.

7. The wet capacitor of claim 1, wherein the electrochemically-active material includes a conductive polymer.

8. The wet capacitor of claim 7, wherein the conductive polymer includes poly(3,4-ethylenedioxythiophene) or a derivative thereof.

9. The wet capacitor of claim 1, wherein the electrochemically-active material includes metal particles, metal oxide particles, or a combination thereof.

10. The wet capacitor of claim 1, wherein the working electrolyte comprises an aqueous solvent.

11. The wet capacitor of claim 1, wherein the anode includes tantalum, niobium, or an electrically conductive oxide thereof.

12. The wet capacitor of claim 1, wherein the anode is anodized and contains a dielectric film.

13. The wet capacitor of claim 1, wherein the cathode has a specific capacitance of about 10 milliFaradays per square centimeter or more.

14. The wet capacitor of claim 1, wherein the cathode has a specific capacitance of from about 25 to about 100 milliFaradays per square centimeter.

15. The wet capacitor of claim 1, wherein the cathode has a thickness of about 100 micrometers or less.

16. The wet capacitor of claim 1, wherein the cathode has a thickness of from about 10 to about 50 micrometers.

17. The wet capacitor of claim 1, wherein the substrate further contains a metal layer.

18. An electrically conductive cathode comprising an anodized metal substrate coated with a conductive polymer, wherein the substrate contains a plurality of pores formed in a surface thereof, the pores having an average size of from about 20 to about 1000 nanometers.

19. The cathode of claim 18, wherein the metal substrate comprises titanium or an alloy thereof.

20. The cathode of claim 18, wherein the pores have an average size of from about 50 to about 500 nanometers.

21. The cathode of claim 18, wherein pores constitute from about 30% to about 70% of a surface of the substrate.

22. The cathode of claim 18, wherein the conductive polymer includes poly(3,4-ethylenedioxythiophene) or a derivative thereof.

23. A method for forming a cathode for use in a wet capacitor, the method comprising:
immersing a metal substrate in an anodizing solution;
applying a current at a first voltage to the metal substrate to effect anodic oxidation and form an anodized substrate containing an oxide film; and
initiating a breakdown of the oxide film to form a plurality of pores in a surface of the anodized substrate that have an average size of from about 10 to about 1500 nanometers.

24. The method of claim 23, further comprising increasing the first voltage to a second voltage, wherein the second voltage is greater than the first voltage and is at or above the breakdown voltage of the oxide film.

25. The method of claim 23, further comprising changing the first voltage to a second voltage, wherein the second voltage has a polarity that is opposite to the polarity of the first voltage.

26. The method of claim 23, wherein the anodizing solution comprises an ionic compound and a corrosive compound.

27. The method of claim 23, wherein the metal substrate comprises titanium or an alloy thereof.

28. The method of claim 23, wherein the pores have an average size of from about 20 to about 1000 nanometers.

29. The method of claim 23, further comprising coating the anodized substrate with an electrochemically-active material.

30. The method of claim 29, wherein the electrochemically-active material includes a conductive polymer.

31. The method of claim 29, wherein the electrochemically-active material includes metal particles, metal oxide particles, or a combination thereof.

32. The method of claim 23, wherein the temperature of the anodizing solution is from about 10° C. to about 50° C.

33. The method of claim 23, further comprising heating the anodized substrate at a temperature of from about 200° C. to about 1400° C. in the presence of a reducing atmosphere.

* * * * *